SEMICONDUCTOR CIRCUIT CONTROLLING DEVICES

Filed July 13, 1955

INVENTOR
I. M. ROSS
BY D.H. Wilson, Jr.
ATTORNEY

United States Patent Office 2,862,115

Patented Nov. 25, 1958

2,862,115

SEMICONDUCTOR CIRCUIT CONTROLLING DEVICES

Ian M. Ross, New Providence, N. J., assignor to Bell Telephone Laboratories, Incorporated, New York, N. Y., a corporation of New York Application July 13, 1955, Serial No. 521,757

2 Claims. (Cl. 307—88.5)

This invention relates to circuit elements having bodies of semiconductive material and more particularly bodies including rectifying barrier regions. In one aspect this invention comprises an improvement of the circuit controlling device disclosed in J. J. Ebers-S. L. Miller (Case 4–2) application Serial No. 521,765, filed July 13, 1955.

A principal object of this invention is to facilitate the control of current in the vicinity of a rectifying barrier region within a semiconductive body.

Another object is to realize a marked shift in the effective emitter position and/or area without restriction as to the conditions in the base region of a semiconductor device.

Other objects are to attain large values of negative dynamic resistance; to optimize the characteristics of a circuit element of the type disclosed in K. B. McAfee application Serial No. 340,529 filed March 5, 1953, now Patent 2,790,034 issued April 23, 1957, and K. G. McKay application Serial No. 464,737 filed October 26, 1954, both utilizing avalanche breakdown to obtain current multiplication in a semiconductor; to alter, during operation, the effective area of a semiconductive junction; and to switch a circuit element having a semi-conductive body selectively between a high and a low resistance state.

A feature of this invention resides in altering the effective area of a rectifying junction in a semiconductive body in response to changes in the current within that body.

Another feature of this invention includes altering the current multiplication of a semiconductive device in response to a current through the device.

An additional feature of this invention is to shift the effective position of an emitter region in a system including emitter, base, and collector regions, to concentrate the emission therefrom to a portion advantageously positioned with respect to a collector so that a high current multiplication is realized.

In accordance with one aspect of this invention, this concentration is effected by an emitter region having a high lateral resistance and a contact thereto adjacent only that portion from which concentrated emission is sought. At low currents the rectifying barrier region between the emitter and base regions has an essentially uniform potential applied across it in the forward direction. However, at higher currents, the lateral flow from the restricted contact along the high lateral resistance of the emitter region results in a potential drop which biases those portions of the barrier spaced from the contact at a low forward potential as compared to the closer portions. Thus, the emission tends to concentrate in the vicinity of the contact to the emitter region. When this contact is placed upon an emitter portion which, in combination with the base and collector regions, offers a high current multiplication and other portions of the emitter spaced from the contact exhibit a low current multiplication in their emitter-base-collector system, this concentration of emission with increased current sharply increases the overall current multiplication.

A similar concentration of emission is attained in the construction disclosed in the aforenoted Ebers-Miller application; however, the shift is effected by a lateral potential gradient introduced by a drop in the base region. This mechanism places limits on the geometry and base resistivity which are not imposed by devices constructed in accordance with the present invention since it is desirable to maintain as high a resistivity and as thin a base region as practicable for optimum operation in the devices of that application. These factors are limited by the power dissipation which can be tolerated and by the tendency of the space charge region of the reverse biased collector barrier to penetrate the base and enter the emitter region with a consequent failure of the device.

A further feature of the invention involves combining an emitter zone having emission concentrating characteristics with a collector rectifying barrier region which exhibits body breakdown to provide an avalanche multiplication. This combination in a diode structure offers a high impedance until a critical voltage is reached and after the critical voltage it triggers into a negative dynamic resistance which is of substantial magnitude and substantially constant over a wide operating range.

Although variations in current multiplication as a function of current in a semiconductor are useful for a number of applications, for example in transistors which can be utilized in automatic gain control circuits in the manner of a variable-mu tube, it will be described below as employed in a device exhibiting avalanche multiplication wherein the increased multiplication with increased current produces a characteristic which, over a relatively wide range, offers an increase in current with a decrease in voltage and thus a negative dynamic resistance.

The above and other objects and features of this invention will be more readily appreciated from the following detailed description when read in conjunction with the accompanying drawings, in which.

As set forth in the aforenoted applications of K. B. McAfee and K. G. McKay, it has been recognized that a substantial multiplication of current occurs in the depletion region of a reverse biased p-n junction when the field in the vicinity of that junction and the distance across which it is imposed attain a critical relationship. This mechanism has been referred to as avalanche breakdown and has been shown to offer a current multiplication within the semiconductive body which can be paralleled to a modified form of the Townsend $\beta$ discharge theory for gases. It has been found, for example that the onset of carrier multiplication in both silicon and germanium occurs when the average field strength at the junction is between about $6 \times 10^4$ volts per centimeter and $10^5$ volts per centimeter and the avalanche breakdown point corresponds to a field strength of about $1.6 \times 10^5$ volts per centimeter for germanium and $2 \times 10^5$ volts per centimeter for silicon. Such a field strength obtains when the voltage across the junction is about one-half the avalanche breakdown voltage. As the voltage increases, as noted hereinabove the carrier multiplication increases until the voltage reaches about the avalanche breakdown value. For increases beyond this, the multiplication decreases.

Figure 1:
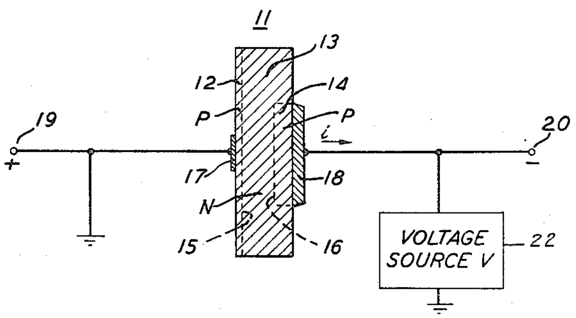
Fig. 1 represents a schematic sectioned elevation of one form of an avalanche multiplication diode in accordance with this invention.
Figure 2:
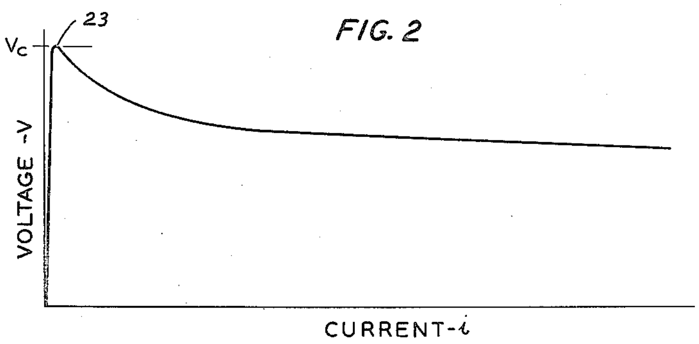
Fig. 2 is the voltage current characteristic of the device of Fig. 1.

A diode structure utilizing these mechanisms is disclosed in Fig. 1, comprising a semiconductive body 11 including three contiguous zones 12, 13 and 14 of alternately opposite conductivity type. This structure, as illustrated in Fig. 2, over a relatively large operating range, offers a negative dynamic resistance. The characteristics of this structure will be more fully appreciated from the following analysis based upon previously published material wherein it has been shown that the current multiplication due to avalanche multiplication can be represented by M. In accordance with the general empirical equation $$M=\frac{1}{1-\left(\frac{V}{V_B}\right)^n}$$

where $V_B$ is the body breakdown voltage of a rectifying junction, V is the voltage applied across the junction, and $n$ is a constant for a given type of junction. For example, for alloy junctions having a steep impurity gradient, commonly termed a step junction, $n$ is of the order of 4.5 to 6.5 for p-type germanium and is of the order of 3 for n-type germanium. The breakdown voltage for an alloy step junction, where the material on one side of the junction is of appreciably greater resistivity than that on the other side, can be calculated from the equation $$V_B=\frac{K}{|N_D-N_A|^{.725}}$$

where K is a constant and $N_D-N_A$ is the net impurity concentration on the high resistivity side of the junction. The total current multiplication $M_T$ of a structure including an emitter of minority charge carriers arranged to emit those carriers into the high resistivity material adjacent the reverse biased junction is of the form $$M_T=\alpha M=\frac{\alpha}{1-\left(\frac{V}{V_B}\right)^n}$$

where $\alpha$ is the current multiplication factor of the structure apart from the avalanche multiplication and is directly dependent upon the product of $\gamma$ and $\beta$, $\gamma$ is the ratio of the minority carriers injected from the emitter into the high resistivity semiconductive material to the total current flow through the emitter, and $\beta$ is the ratio of minority charge carriers collected at the collector to the minority charge carriers emitted by the emitter.

A device of the type shown in Fig. 1 has a current characteristic satisfying the equation $$I=\alpha MI_E+MI_{CO}=I_E$$

This gives a voltage current relationship $$V_B\sqrt[n]{1-\left(\alpha+\frac{I_{CO}}{I}\right)}$$

where I is the total current through the device which, for a two terminal device is equal to the emitter current $I_E$; $I_{CO}$ is the saturation current of the reverse biased collector junction.

In accordance with this invention, voltage V can be made to decrease as the total current I is increased over a range of operation by altering the current multiplication factor $\alpha$ as a function of current. The device shown in Fig. 1 illustrates one means of accomplishing this result. It comprises a semiconductive wafer 11 of single crystal germanium, for example about 1½ mils thick, and having square major faces about 50 mils on a side. The wafer includes a zone 13 of $n$ conductivity type material which functions as a base region and a pair of zones 12 and 14 of $p$ conductivity type material located on opposite major faces of the wafer and separated a substantially constant distance by the intermediate base region. Rectifying barrier regions in the form of n-p junctions 15 and 16 are present at the interfaces between zone 12 and zone 13, and zone 13 and zone 14, respectively. In the embodiment illustrated, zone 12 and its junction 15 are of substantially greater lateral extent than zone 14 and its junction 16; however, it is to be understood that the mechanism utilized will function where these areas are of substantially the same extent.

Zone 12 is provided with a high lateral resistance as by limiting its cross-sectional area in the lateral direction and/or forming it of high resistivity material. A connection 17 is made to zone 12 opposite the inner portion of a projection of zone 14 through wafer 11, advantageously at the center of that projection. The characteristics of zone 14 are not critical. It can conveniently be formed of low resistivity material and have a metallic surface layer 18 over essentially all of its exposed surface.

In operation as an avalanche multiplication diode having negative resistance, the unit of Fig. 1 is so biased that zone 12 functions as an emitter of holes into base region 13 and zone 14 functions as a collector of holes from the base. This is accomplished by biasing terminal 19, the emitter terminal, positive with respect to terminal 20, the collector terminal. Until the voltage exceeds the critical value, $V_c$, the reverse biased collector junction passes only its saturation current and little current flows in the emitter zone 12. The emitter is subjected to a low forward bias, essentially all of the drop is across the collector junction 16, and there is no substantial lateral potential gradient across the emitter junction. In this state an essentially uniform density of holes is emitted from all portions of the emitter. Those holes diffuse along random paths in the base; accordingly, a large proportion of those emitted from the emitter portion opposite the center of the collector reach the collector, i. e., that portion has a high $\beta$ while the proportion decreases from the other emitter portions as the spacing from the center increases until at the maximum separation from the collector beyond a projection of the collector, $\beta$ is at very low values. The net $\beta$ and thus the over-all current multiplication at these low currents is thus low.

When the voltage across terminals 19 and 20 has reached $V_c$, about the body breakdown voltage in the base in the vicinity of the collector junction 16, usually in the range of 20 to 60 volts in step junctions of germanium, the device enters a high current range of operation. This current tends to concentrate in the emitter zone immediately under contact 17 since that portion of the emitter is more forward biased than any other. The potential across those emitter portions decreases toward the lateral periphery of the emitter due to the drop in the high lateral resistance of emitter zone 12. Thus, the portions of the emitter spaced from the contact tend to be eliminated as effective minority carrier emitters. Since these portions which degrade the current multiplication at low currents are eliminated at higher currents, the current multiplication $\alpha$ increases and a V-I characteristic of negative slope, as shown in Fig. 2 results.

Accordingly the voltage source 22 connected between the two terminals of the device is of a polarity such that emitter junction 15 is biased in its forward direction relative to base 13 and of a potential magnitude, to attain the characteristic of Fig. 2, to cause substantial current multiplication at the collector junction 16. In the characteristic of Fig. 2, the breakdown potential of the device of Fig. 1 is defined as the potential of the point 23 at which the total current multiplication $M_T$ first becomes equal to unity.

An avalanche multiplication diode of the type shown in Fig. 1 can be fabricated from a 1.5 mils thick wafer of single crystal n-type germanium by alloying aluminum from an evaporated film about .1 mil thick into one major face to form emitter zone 12 and alloying an aluminum mass to the opposite major face to form collector zone 14. The collector can be formed from an aluminum button about 30 mils in diameter alloyed at some temperature in excess of the aluminum-germanium eutectic. The aluminum surface can then be employed as surface 18.

Figure 3:
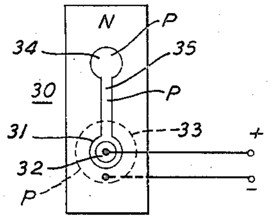
Fig. 3 is a schematic plan view of another avalanche multiplication diode form.

The emitter region is formed, for example, in a cycle involving heating the assembly including the vapor deposited film for five minutes at 400° C. followed by a brief rise to 700° C., and then cooling it in five or ten seconds. It can extend over the entire wafer face, have a circular periphery or advantageously be in the shape of a dumbbell as shown in Fig. 3. It should be of relatively high lateral resistance, at least a few hundred ohms per square, outside the region of the contact. This can be achieved by masking the surface layer of aluminum to be employed as contact 17 after the film has been alloyed, and removing the exposed aluminum and any excess thickness of regrown p-type material thereunder as by etching in sodium hydroxide and a suitable germanium etchant. Connections can be made to the aluminum surfaces by bonding gold wires thereto, for example with condenser discharges, care being taken to avoid penetrating to the underlying n–p junctions.

A dumbbell-shaped emitter region 30 as shown in Fig. 3 offers particular advantages when one enlarged end 31 bears a contact 32, and is positioned opposite the center of the collector 33 and the other enlarged end 34 is connected thereto by an integral high resistance filament 35. A typical structure includes a 30 mils diameter collector, a 15 mils diameter emitter contact concentric with a projection through the wafer of the collector, and a resistance from the contact to the second large area region which introduces a voltage drop at currents in the range of negative resistance operation above a few tenths of a milliampere, which is large compared to $$\frac{KT}{q}$$

This resistance should be a few thousand ohms. A similar magnitude of resistance from the emitter contacts to the extremes of the other forms of emitter is desirable.

While the specific devices described have been formed of germanium having alloyed step junctions and are of an n–p–n configuration, it is to be understood that the conductivity type employed in the various regions may be reversed and that other semiconductors, such as silicon, silicon-germanium alloys, and intermetallic compounds of group III and group V elements may be employed as the semiconductor in a device of this type. Further, while the specific parameters such as breakdown voltage and the avalanche multiplication factor would vary with the basic material and the form of the junctions therein, they in general follow the characteristics set forth above, and could be adopted for use as proposed. An appropriate reversal of potentials would enable an n–p–n structure to be substituted for the p–n–p structures of the illustrative embodiments. Further, the variations in $\alpha$ as a function of a current can be realized by combining the mechanisms utilized in the aforementioned Ebers-Miller application with those proposed herein, as by employing a base region having a lateral resistivity gradient therein adjacent the emitter junction.

It is to be understood that the above-described arrangements are illustrative of the application of the principles of the invention. Numerous other arrangements may be devised by those skilled in the art without departing from the spirit and scope of the invention.

What is claimed is:

1. A circuit arrangement including in combination a circuit controlling device comprising a semiconductive wafer having on opposite faces first and second zones, each forming a distinct rectifying junction with the portion of the wafer intermediate said two zones, the lateral area of the rectifying junction associated with the first zone being substantially equal to the lateral cross section of the wafer and the lateral area of the rectifying junction associated with the second zone being substantially less than the lateral cross section of the wafer, and electrode means connected to said wafer consisting of a first electrode connection to said first zone making contact with only a limited portion of the surface area of said first zone, a second electrode connection to said second zone, the portion of the wafer intermediate said first and second zones being free of any electrode connections, and means for applying across the first and second electrode connections to the wafer a potential difference which biases the rectifying junction associated with the first zone in the forward direction and the rectifying junction associated with the second zone in the reverse direction to a point of avalanche multiplication.

2. A circuit arrangement including in combination a circuit controlling device comprising a semiconductive wafer having an intermediate portion of one conductivity type and on opposite sides of said intermediate portion first and second terminal zones of the conductivity type opposite that of the intermediate portion for forming first and second rectifying junctions with said intermediate portion, the first rectifying junction having a lateral area substantially equal to the lateral cross section of the intermediate portion of the wafer and the second rectifying junction having a lateral area substantially less than the lateral cross section of the intermediate portion of the wafer, electrode means connected to said wafer consisting of a first electrode connection to said first zone contacting only a limited portion of the external surface area of said first zone and an electrode connection to said second zone, the intermediate portion of the wafer being free of any electrode connection, and voltage supply means for biasing the first rectifying junction in a forward direction and the second rectifying junction in reverse to the point of avalanche multiplication.

References Cited in the file of this patent

UNITED STATES PATENTS

| | | |
|---|---|---|
| 2,666,814 | Shockley | Jan. 19, 1954 |
| 2,672,528 | Shockley | Mar. 16, 1954 |
| 2,709,232 | Thedieck | May 24, 1955 |